(12) United States Patent  
Pashintsev et al.

(10) Patent No.: US 9,235,768 B1  
(45) Date of Patent: Jan. 12, 2016

(54) CUSTOM DRAWINGS AS CONTENT ACCESS IDENTIFIERS

(71) Applicant: EVERNOTE CORPORATION, Redwood City, CA (US)

(72) Inventors: Alexander Pashintsev, Cupertino, CA (US); Keith Lang, Austin, TX (US); Juan Carlos Jimenez, Cedar Park, TX (US); Eugene Livshitz, Moscow (RU)

(73) Assignee: Evernote Corporation, Redwood City, CA (US)

( * ) Notice: Subject to any disclaimer, the term of this patent is extended or adjusted under 35 U.S.C. 154(b) by 131 days.

(21) Appl. No.: 14/064,654

(22) Filed: Oct. 28, 2013

Related U.S. Application Data

(60) Provisional application No. 61/727,904, filed on Nov. 19, 2012.

(51) Int. Cl.
*G06K 9/34* (2006.01)
*G06K 9/00* (2006.01)

(52) U.S. Cl.
CPC ........ *G06K 9/00852* (2013.01); *G06K 9/00496* (2013.01)

(58) Field of Classification Search
None
See application file for complete search history.

(56) References Cited

U.S. PATENT DOCUMENTS

| | | |
|---|---|---|
| 7,437,003 B1 | 10/2008 | Gorbatov et al. |
| 7,969,440 B1 | 6/2011 | Polyakov et al. |
| 8,014,630 B1 | 9/2011 | Polyakov et al. |
| 8,023,746 B2 * | 9/2011 | Ackley et al. ...... G06K 7/10722 235/462.08 |
| 2007/0282893 A1 * | 12/2007 | Smith et al. .................. 707/102 |
| 2008/0155540 A1 * | 6/2008 | Mock et al. .................. 718/100 |
| 2010/0223221 A1 * | 9/2010 | Gardner et al. ................ 706/45 |
| 2012/0023171 A1 * | 1/2012 | Redmond ..................... 709/205 |
| 2012/0113460 A1 * | 5/2012 | Oda ............................. 358/1.15 |
| 2013/0041948 A1 * | 2/2013 | Tseng .......................... 709/204 |
| 2014/0050396 A1 | 2/2014 | Libin et al. |
| 2014/0050398 A1 | 2/2014 | Pashintsev et al. |
| 2014/0050409 A1 | 2/2014 | Constantinou et al. |

* cited by examiner

*Primary Examiner* — Eueng-Nan Yeh
(74) *Attorney, Agent, or Firm* — Muirhead and Saturnelli, LLC

(57) ABSTRACT

Providing access to digitally published data includes creating a note having at least a portion that is handwritten by a first user, converting handwriting of the note into a content access identifier that varies according to the portion that is handwritten by the first user, associating the content access identifier with the digitally published data, and making the digitally published data available to a second user by making the note available to the second user. The digitally published data may be written to a public database and/or a private database. A portion of the note may be pre-printed. A pre-printed distinguishing pattern on the note may indicate that handwritten content corresponds to a content access identifier. The preprinted portion may be a regular dotted pattern. The note may have a known identifiable color and size.

48 Claims, 6 Drawing Sheets

CUSTOM DRAWINGS AS CONTENT ACCESS IDENTIFIERS

CROSS-REFERENCE TO RELATED APPLICATIONS

This application claims priority to U.S. Prov. App. No. 61/727,904, filed Nov. 19, 2012, and entitled "USING PHOTOGRAPHS OF CUSTOM DRAWINGS AS CONTENT ACCESS IDENTIFIERS FOR DATA SHARING", which is incorporated herein by reference.

TECHNICAL FIELD

This application is directed to the field of analyzing and processing information, especially in conjunction with access to online personal and shared content.

BACKGROUND OF THE INVENTION

As of the third quarter of 2012, over one billion people are using smartphones worldwide, and the number is expected to double by 2015. A significant percent of these users are combining their everyday digital lifestyle with paper habits at their work, home and leisure time. One of the main advantages offered by the traditional pen & paper paradigm is the ability of quick, high resolution handwriting on a compact physical medium resulting in a persistent original note with a limited and targeted distribution. Because of the high ink capturing resolution, the density of handwritten information entered even on a small paper sticker or a card may exceed by a great margin the same on existing tablets or smartphones with much larger screens. While graphical resolution of modern displays, such as Apple Retina Display, is approaching physiological limits and makes these displays, in terms of content rendering, virtually as good as high quality paper publications, this may not apply to a relatively low tablet resolution for capturing handwriting, especially on capacitive mass market screens. Additionally, user writing on tablet screens suffers from glossy surfaces, unwieldy pens with imprecise positioning, etc. This is contrasted by a satisfying experience of writing on paper. Additionally, paper documents possess trusted authentication and authorization capabilities due to unique biometric parameters of human handwriting. This includes personal signatures, such as found on paper checks and on many important forms.

Numerous attempts have been made to bridge traditional note capturing with the electronic culture. Companies like Acecad, Anoto, EPOS, Wacom, Waltop and many other technology and product vendors have developed devices and methods for instant digitizing of handwriting and drawings from a traditional paper and for capturing handwritten documents in the electronic form using a variety of acoustic, infra-red, optical, electromagnetic and other technologies. Still, in spite of significant advances, interactive digital pen and paper technologies have found a limited market adoption.

Growing shipment volumes of camera-enabled smartphones and the proliferation of personal content management systems and software with storing, advanced processing and search capabilities for digital images, such as implemented in the Evernote service and software developed by Evernote Corporation of Redwood City, Calif., make photographing handwritten documents a ubiquitous and preferred method of synthesis of paper based materials with the paperless lifestyle. The combination of paper supply recognizable from photographs with handwritten notes taken on such paper brings new ways of interaction between physical and digital worlds. The question remains, however, whether such interactions could, on the one hand, facilitate access to published digital materials from the physical world of paper-based handwritten notes and, on the other hand, prevent unwanted access to published materials.

Accordingly, it is desirable to develop advanced methods of interactive uses of handwritten pages photographed on smartphones for access to digital materials.

SUMMARY OF THE INVENTION

According to the system described herein, providing access to digitally published data includes creating a note having at least a portion that is handwritten by a first user, converting handwriting of the note into a content access identifier that varies according to the portion that is handwritten by the first user, associating the content access identifier with the digitally published data, and making the digitally published data available to a second user by making the note available to the second user. The digitally published data may be written to a public database and/or a private database. A portion of the note may be pre-printed. A pre-printed distinguishing pattern on the note may indicate that handwritten content corresponds to a content access identifier. The pre-printed portion may be a regular dotted pattern. The regular dotted pattern may be used to separate handwriting on the note from a background portion and to identify page corners and perform the perspective correction. The note may have a known identifiable color and size. Color identification and size may be used to separate handwriting on the note from a background portion and to identify page corners and perform the perspective correction. Converting the note may include obtaining a digital image thereof using a mobile device. Obtaining the digital image may includes photographing the note and/or scanning the note. A mobile device may convert the note into the content access identifier using software that is pre-loaded with the device, installed from an app store, and/or downloaded from a Web site. The mobile device may use an operating system selected from the group consisting of: iOS, Android OS, Windows Phone OS, Blackberry OS and mobile versions of Linux OS.

According further to the system described herein, accessing digitally published data includes receiving information corresponding to a note having at least a portion that is handwritten, converting handwriting of the note into a content access identifier that varies according to the portion that is handwritten, and accessing the digitally published data using the content access identifier. Users may not access the digitally published data without first accessing the content access identifier and/or the note. Information corresponding to the note may include the note, a physical copy of the note, and/or a digital image of the note. The note may be affixed to an item to provide information about the item. The information may include instructions for using the item. The note may be affixed to a container to indicate contents thereof. Converting the note may include obtaining a digital image thereof using a mobile device. Obtaining the digital image may include photographing the note and/or scanning the note. A mobile device may convert the note into the content access identifier using software that is pre-loaded with the device, installed from an app store, and/or downloaded from a Web site. The mobile device may use an operating system selected from the group consisting of: iOS, Android OS, Windows Phone OS, Blackberry OS and mobile versions of Linux OS.

According further to the system described herein, computer software, provided in a non-transitory computer readable medium, provides access to digitally published data. The software includes executable code that converts handwriting of a note having at least a portion that is handwritten by a first user into a content access identifier that varies according to the portion that is handwritten by the first user, executable code that associates the content access identifier with the digitally published data, and executable code that makes the digitally published data available to a second user by making the note available to the second user. The digitally published data may be written to a public database and/or a private database. A portion of the note may be pre-printed. A pre-printed distinguishing pattern on the note may indicate that handwritten content corresponds to a content access identifier. The pre-printed portion may be a regular dotted pattern. The regular dotted pattern may be used to separate handwriting on the note from a background portion and to identify page corners and perform the perspective correction. The note may have a known identifiable color and size. Color identification and size may be used to separate handwriting on the note from a background portion and to identify page corners and perform the perspective correction. Executable code that converts the note may obtain a digital image thereof using a mobile device. Obtaining the digital image may include photographing the note and/or scanning the note. The software may be pre-loaded in a mobile device, installed from an app store, and/or downloaded from a Web site. The mobile device may use an operating system selected from the group consisting of: iOS, Android OS, Windows Phone OS, Blackberry OS and mobile versions of Linux OS.

According further to the system described herein, computer software, provided in a non-transitory computer-readable medium, accesses digitally published data. The software includes executable code that receives information corresponding to a note having at least a portion that is handwritten, executable code that converts handwriting of the note into a content access identifier that varies according to the portion that is handwritten, and executable code that accesses the digitally published data using the content access identifier. Users may not access the digitally published data without first accessing at least one of: the content access identifier and the note. Information corresponding to the note may include the note, a physical copy of the note, and/or a digital image of the note. The note may be affixed to an item to provide information about the item. The information may include instructions for using the item. The note may be affixed to a container to indicate contents thereof. Executable code that converts the note may obtain a digital image thereof using a mobile device. Obtaining the digital image may include photographing the note and/or scanning the note. The software may be pre-loaded in a mobile device, installed from an app store, and downloaded from a Web site. The mobile device may use an operating system selected from the group consisting of: iOS, Android OS, Windows Phone OS, Blackberry OS and mobile versions of Linux OS.

The proposed system is based on the use of handwritten content entered on a page, sticker, card or other writable media as a custom identifier of cloud-centric content, as well as of an action or an application created and assigned by an author of the content. A user-friendly handwritten form of content access identifiers has many advantages over pre-printed identifiers such as barcodes, two-dimensional QR codes, etc. Thus, in contrast with pre-printed identifiers, handwritten content access notes may be created by users without any extra printing hardware and software and may include accompanying text explaining the purpose of identifiers on the notes and basic instructions of use of the notes. Rather than machine preprinted identifiers permanently affixed on a surface and/or packaging of goods in a distribution process, handwritten access notes may serve as flexible ad hoc stickers created and be modified as needed, accompanying any securely published digital content as access vouchers or affixed to any objects to associate such published content with presence, functioning or other features of such objects.

In an embodiment, writable media for handwritten content access notes may be supplied with a pre-printed distinguishing pattern which signals to the system that a handwritten content photographed from the media should be interpreted as an identifier. A mechanism for designing and reproducing paper-based pre-printed patterns is described in U.S. patent application Ser. No. 13/958,001 titled: "USING SURFACES WITH PRINTED PATTERNS FOR IMAGE AND DATA PROCESSING", filed on Aug. 2, 2013 by Pashintsev, et al. and incorporated by reference herein. Notebooks with pre-printed regular dotted patterns, pioneered by the Evernote Smart Notebook by Moleskine, allow for a seamless and reliable identification of the page type, with subsequent identification of page boundaries, correction, and improved handwriting recognition from images of photographed notebook pages. The system described herein may interpret a handwritten note on such a page as a unique identifier of an associated content, action or application. In other embodiments, content access notes may be written on any type of paper or other writable media, such as plastic, wood, painted surfaces, etc., provided that a recipient of content access note photographs and submits such notes to content access software instructing the software to interpret the photograph as a handwritten content access note.

An author of specialized handwritten content access note may publish any type of content, accompanying instructions and/or application(s) in the cloud (for example, as a set of Evernote notes) and then designate a separate handwritten note as an access identifier, which will automatically direct to the created content anyone with such identifier, an appropriate software installation, and valid service credentials. The cloud may correspond to a public or private database, either of which may or may not support restricted access thereto.

In an embodiment, an author (content creator, writer) may publish photographs of handwritten notes taken on pages of an Evernote Smart Notebook by Moleskine to a personal Evernote account (such capability is automatically provided by smart Moleskine notebooks) and then share the set of notes on a secure website. Then, the author may draw a separate doodle or write a couple words on a next page of the same Evernote Smart Notebook by Moleskine and take a photo of the page on a smartphone using special software to transform the doodle or other access related note into a content access identifier for the published content. Subsequently, the software may associate the content access identifier with the previously published cloud-based content. Future access to the content by other users via the same smartphone application may depend on distribution steps of the author. Several examples are presented below:

The author may elect to give the physical handwritten access note to a friend or other recipient who may take a photo of the note and have the specialized software build the content access identifier and retrieve the corresponding content.

The author may choose to make tangible copies of the handwritten access note using a copier, a scanner and a printer, a camera and a printer, and/or any other physical copying solution and hand or send the resulting physical copy to others. Each recipient who has appropriate software installed on a smartphone and/or other feasible device (e.g., a laptop computer, a tablet, a desktop computer, etc.) may then restore the content access identifier and retrieve the corresponding content as explained in the previous example.

The author may take a photograph of the handwritten access note and email copies of a resulting image to others who may submit the received image to content access identifier building software. Any of such users that are capable of building a valid content access identifier would gain access to the corresponding content.

A notable difference between the first two examples, on the one hand, and the third example, on the other hand, is additional security provided in the former cases. Since in the first two examples handwritten access notes are not transferred digitally and are not transmitted through public networks, but rather exist only in physical form until the very moment of accessing the content by recipients, there is a significantly lower probability of intercepting and compromising the materials compared with the third example. In fact, only perpetrators who are able to steal a tangible copy of the original handwritten access note from the author or a recipient or who managed to make an illegal additional copy of the original handwritten access note may gain unauthorized access to the materials. Both damaging situations are quite unlikely if the author and a relatively small circle of recipients take at least a basic level of care about the physical copies.

In this way, handwritten access notes, associated with a portion of published content and possibly provided on a special identifiable media, provide input data to an identification and authorization engine for accessing such content. Such a capability relies upon two tasks:

(1) Identification by the system of a writable medium (sticker, card, adhesive label, etc.) capable of carrying dedicated handwritten notes for access identifiers.

(2) Building a reliable and unique access identifier from a photograph of a handwritten access note.

The first task has been solved by Evernote in conjunction with processing photographs of handwritten pages in Evernote Smart Notebooks by Moleskine and is based on pre-printing of certain regular patterns on the paper media, as explained in the above-referenced U.S. patent application Ser. No. 13/958,001, incorporated by reference herein. Proposed mechanisms may also apply to non-paper based writable media. Techniques for building unique identifiers from images and other types of media may be further associated with the recovery of pre-printed and custom regular pattern from photographs of paper pages and other units of writable media and using such restored pattern as a reference grid for handwritten strokes in an access note. Additionally, the task (2) may be addressed by content identification and recognition applications, such as Shazam or SoundHound for audio, PhotoDNA by Microsoft and PixID by Idée for images, etc. Such mechanisms may employ diverse CBIR (Content Based Image Retrieval) techniques.

A possible technique for producing and searching for a handwritten access identifier is explained below:

A. The system receives a photograph or other image of a handwritten note taken on recognizable media.

B. The image is normalized using characteristic attributes of the recognizable media. For example, when a handwritten note is entered on a page with simple printed pattern, such as a page of an Evernote Smart Notebook by Moleskine, the system may perform a perspective correction and obtain a rectangular image of the page and its type using the technique described in the above-referenced U.S. patent application Ser. No. 13/958,001. As an example, when a page with handwriting is a Post-It® note of known color identifiable by the system, color identification and processing on an image may be used to separate handwriting on the page from a background of the page on the image, identify page corners, and perform the perspective correction (relying on a known aspect ratio of the page).

C. Binarization of the normalized image leaves the black handwriting and the white (i.e., contrasting) background. Techniques for eliminating image defects resulting from poor lighting conditions, lens flare, partial obstruction, etc. are described in the above-referenced U.S. patent application Ser. No. 13/958,001.

D. The page is split into rectangular cells of an M×N grid. Subsequently, for each cell, the system generates a descriptor (encoding word, encoding set of symbols) for a full code of the page, and some of the descriptors are used in a search code of the page, as explained in more detail below.

E. For each point on a handwritten trajectory, a tangent line is calculated using known geometric methods. A tangent angle is assigned a value on a uniform scale $1 \ldots K$, which is determined by dividing the circle into a fixed number of K congruent sectors. Then, the frequency distribution of tangent angles for handwriting within each cell is built, resulting in the sequence $N_1, \ldots, N_K$ where $N_i$ is a number of points of the trajectory in the cell for which the angle of the tangential line falls into the i-th sector of the angular scale.

F. Frequencies $\{N_i\}$ form a basis of cell descriptors. However, prior to forming the descriptors, frequency values are corrected for boundary effects between adjacent cells and for empty cells and undergo quantization as follows:

a. Frequency distribution in each cells is blurred by applying Gaussian filter overlapping with portions of adjacent cells; frequency values from tails of blurred cells are added to the corresponding frequencies in adjacent cells. This tweak, in conjunction with the next step, accounts for insignificant boundary effects when the trajectory slightly touches an adjacent cell b. Quantization of the original frequency values $N_i$ converts the original frequency values into normalized frequency values $P_i$ on a uniform scale $0 \ldots L$ where zero corresponds to the absence of points and L corresponds to the range of maximum values determined based on image, binarization and filtering resolution and other factors.

c. Cells where all frequency values $P_i$ fall below a predefined threshold are considered empty and all values $P_i$ are replaced with zeros.

G. Cell descriptor $d_{ij}^C$ for a cell $C_{ij}$, $i=1 \ldots M$, $j=1 \ldots N$ includes cell coordinates and a frequency vector corresponding to handwriting in the cell (and tails of blurred values from adjacent cells):

$$d_{ij}^C = (i, j, \{P_k\} k=1 \ldots K)$$

H. Each descriptor is represented as a binary word and is encoded by symbols in a chosen alphabet forming a descriptor word. The array of descriptor words for all M×N cells forms the full code of the page. A smaller array of descriptor words for non-empty cells (see item F.c above) forms the search code of the page.

When an author of distributed materials and of a handwritten access note takes an original photo to associate the note with the published materials, full code of the page is stored with the published information. When a recipient takes a photo or otherwise obtains an image of the handwritten access note, only the search code of the page is calculated and is searched within the stored full code using a query to find all descriptor words. If the query terminates with a positive search result then authentication of the recipient is accepted and the recipient gains access to the published materials. This technique of search/full code implementation allows using mainstream commercial search engines such as Apache Lucene in verifying handwritten identifiers.

In embodiments, stickers or adhesive labels with identifiable patterns pre-printed on surfaces of the stickers may carry handwritten notes and may be affixed to installed appliances, furniture and other goods to drive users to cloud-based manuals, usage instructions, tips, and other related content. The stickers may serve as access identifiers for the related materials and applications. For example, an employee may find a new coffee machine in employee's office with a sticker containing a handwritten note attached to the machine. The sticker may include a doodle and a couple words, for example, "Coffee tips". The employee may then use a smartphone with the installed smart sticker application to take a photo of the note, and within moments, an animated operation manual for the machine may appear on the smartphone screen. In another example, a shopper in a furniture showroom may find a sticker at a back side of a couch inviting to view all upholstery designs for the model. After the shopper takes a smartphone photo of the sticker, a list of upholstery designs in different colors and decors may appear on the smartphone screen.

In yet another embodiment utilizing handwritten access notes as stickers, the system may be used for small-to-mid size warehousing where digital photos of physical goods or other description of content in each storage unit is published in the cloud (possibly on the intranet of the warehousing company) and each unit is labeled with a custom handwritten access note, so that anyone with the need to know the content of storage units may take a photo of the sticker with a smartphone and instantly receive the content listing and/or the actual photographs of the content on the smartphone screen.

In some embodiments, an identification mechanism may be built directly into the published or otherwise stored media to track modifications. For example, photographs of handwritten notes taken on several pages of an Evernote Smart Notebook by Moleskine may be turned into separate notes in the Evernote software and service; each note may be supplied with several unique identifiers built for handwritten information present in characteristic zones of the corresponding page. If a user adds handwritten information to some of the previously entered page(s) and submits photographs of the pages to Evernote, the system may analyze the content in each zone, build the corresponding identifiers, and compare the result with the originally stored identifiers. If there is a match for at least one such identifier (which means that the new content has not been written over the respective zone of a page), then the new photograph may be considered as a new revision of the original and the corresponding note may be updated to the new photograph, while the original photograph may be entered into the note (revision) history.

According to the system described herein, an author's workflow may include the following:

Compiling the original content.

Publishing the content in the cloud.

Writing a handwritten access note on an appropriate piece of an identifiable writable media; the note serving as a source of future content access identifier.

Obtaining, via special software, the content access identifier and associating content access identifier with the content.

Copying and distributing the handwritten access note in the tangible and/or electronic form, as explained elsewhere herein.

A list of actions for a recipient may include:

Taking a photo of the handwritten access note if the note arrived in a tangible form Converting the photo, via special software, into the content access identifier Retrieving and using the published content, provided the content access identifier has been restored correctly.

In other embodiments, information about documents stored in the cloud (or another database) may be identified by embedded images that encode access identifiers. For example, a designated page of a multi-page TIFF image may contain a digital sticker associated with the image and may protect the rest of information, as explained elsewhere herein. If the TIFF image is offered to a user in a printed form, the accompanying information may be retrieved by a recipient who photographs the sticker using a smartphone and converts the sticker image into the content access identifier, as in other embodiments. If the image is presented digitally, then a special application may retrieve the sticker page when the page is placed by a user on a visible screen or by automatic scanning of multiple image pages, with subsequent conversion of the handwritten access note image into the access identifier.

In yet other embodiments, the system may automatically generate images for encoding the content both via programmatic screen capturing and by photographing printouts of the images or screen displays of the images, without necessarily creating access images as handwritten notes.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for accessing published content via access identification images that serve as specific vouchers and are transformed by the system into unique digital codes for content access after a content recipient digitizes such image and uses dedicated software to generate the unique digital code. In some embodiments, access images are originated from handwritten notes on a designated writable media; in other embodiments, access images may be chosen directly from digital libraries or automatically generated by the system.

Figure 1:
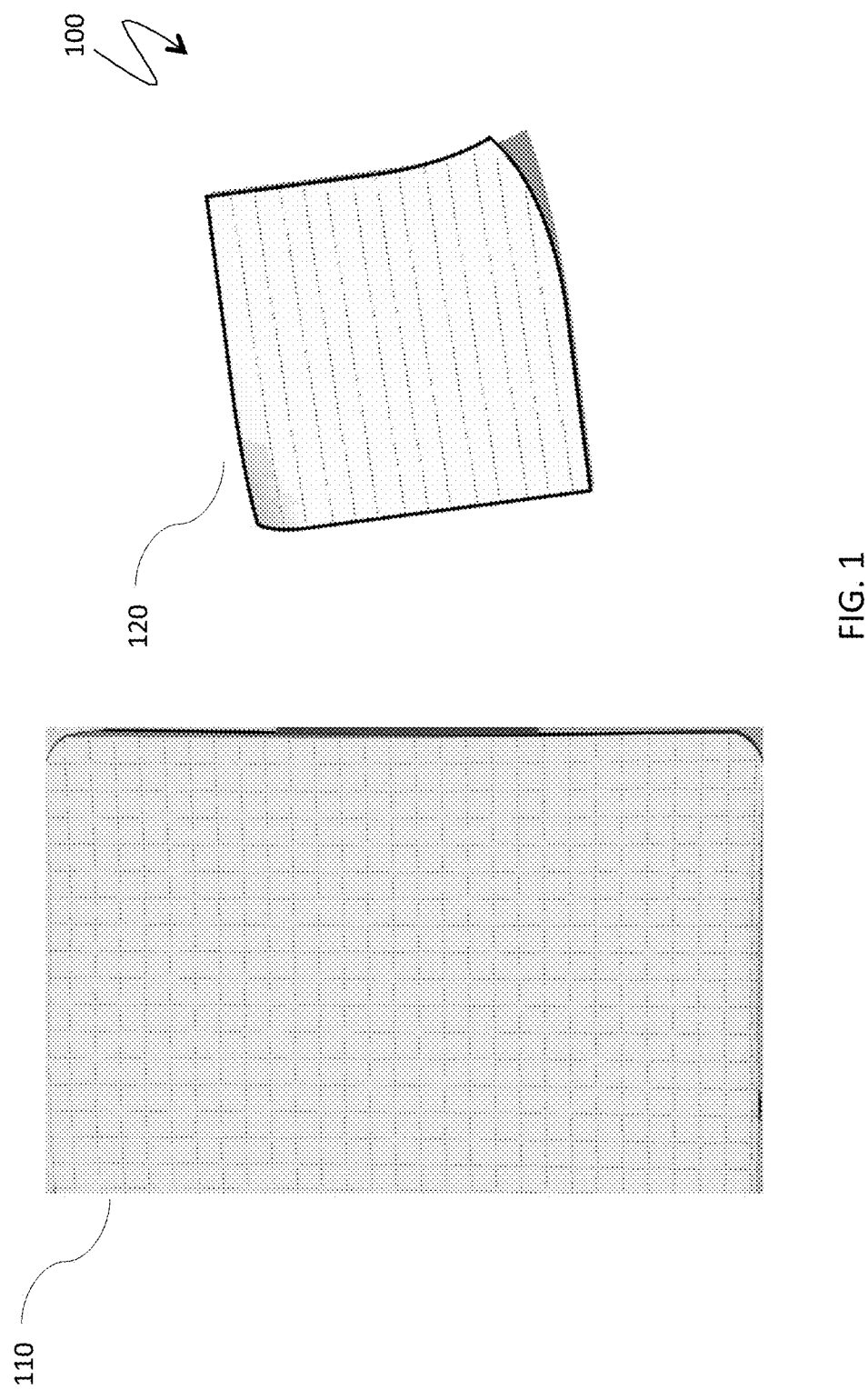
FIG. 1 is a schematic illustration of blank pages of identifiable paper media, according to an embodiment of to the system described herein.

FIG. 1 is a schematic illustration 100 of blank pages of identifiable paper media. A first page 110 and a second page 120 are paper pages with a simple periodic preprinted dotted pattern. The page 110 has a portrait orientation and a cell-based dot pattern. The page 120 has a square sticky note form factor and has a line-based dot pattern.

Figure 2:
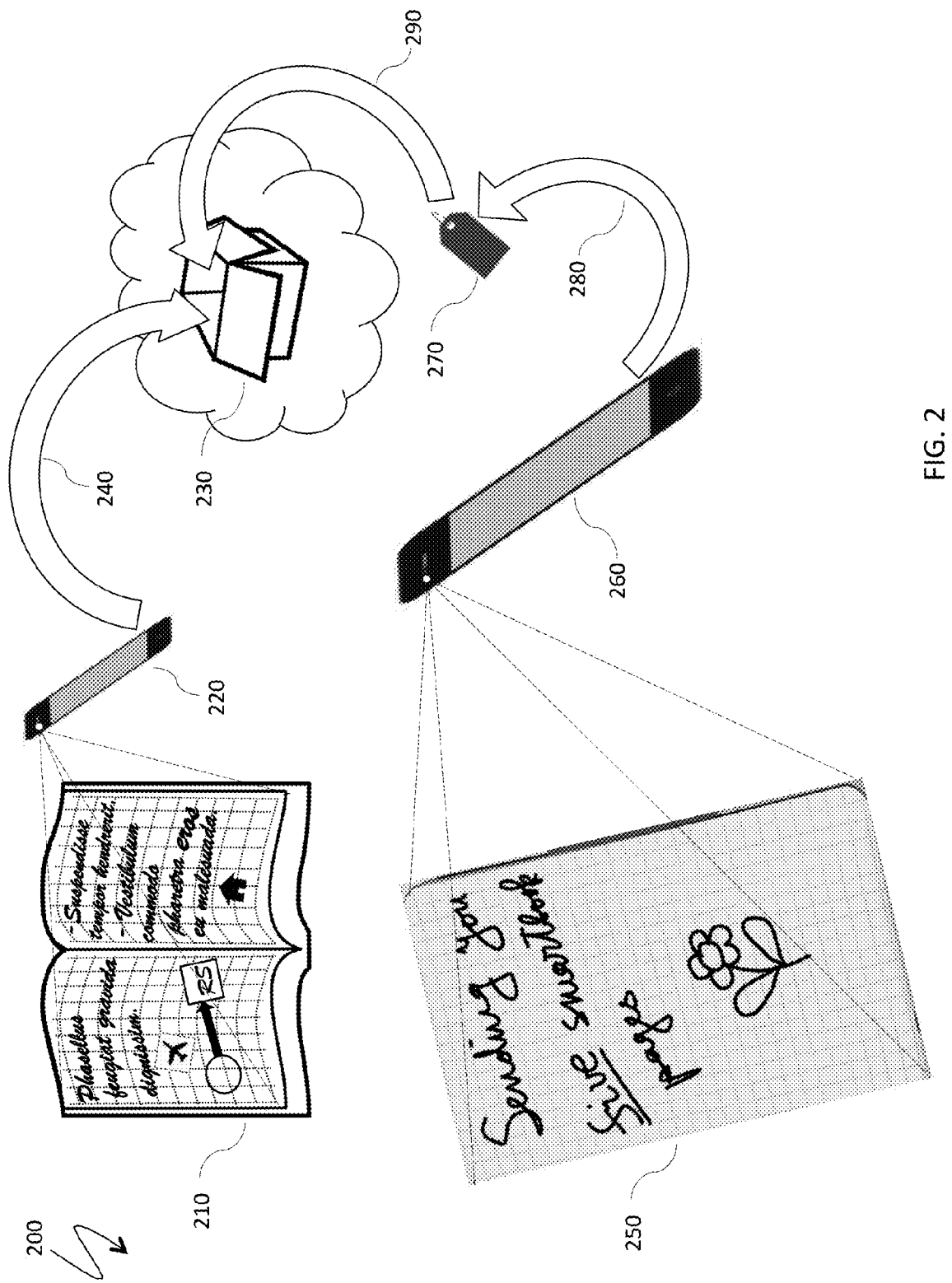
FIG. 2 is a schematic illustration of workflow of a content author, according to an embodiment of the system described herein.

FIG. 2 is a schematic illustration 200 of workflow of a content author. The illustration 200 shows steps for creating and publishing content and creating, processing, and associating a handwritten access note with the published content, according embodiments of the system described herein. A source of original content 210 is represented by handwritten notes and affixed stickers on pages of an Evernote Smart Notebook by Moleskine. An author takes photographs of the pages with a smartphone 220 equipped with a camera. Subsequently, content is published to a cloud-based non-public content collection 230, as illustrated by an arrow 240. To enable custom access to the published content, the author handwrites an access note 250 and takes a photograph of the note 250 with a smartphone 260. Subsequently, mobile software running on the smartphone 260 converts the photograph into a digital content access code 270, which may include content location and login credentials, as illustrated by an arrow 280. Then, the content is associated, by author demand, with the published content, as shown by an arrow 290.

Figure 3:
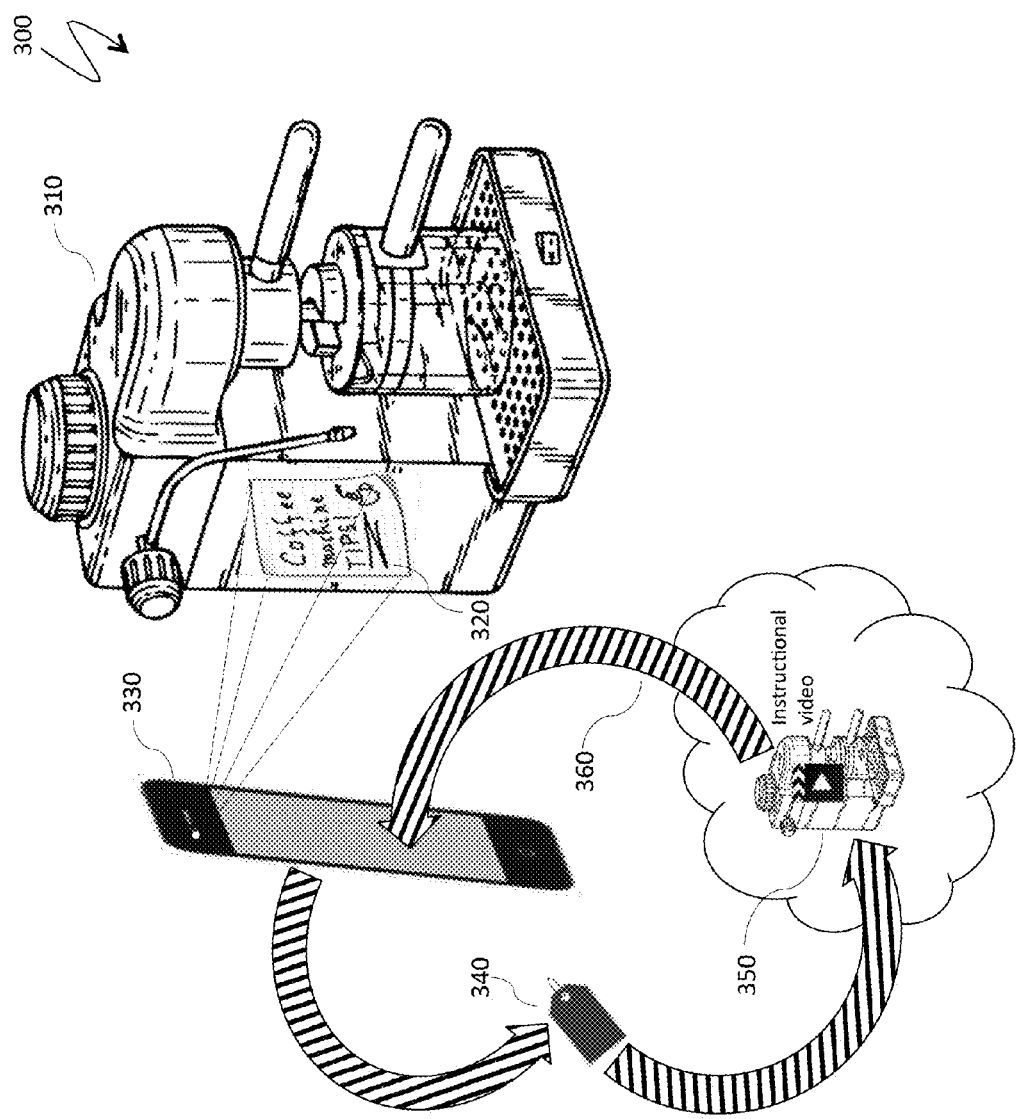
FIG. 3 is a schematic illustration of a sample content retrieval workflow, according to an embodiment of the system described herein.

FIG. 3 is a schematic illustration 300 of a sample content retrieval workflow. The illustration 300 is an example of obtaining instructional materials for a new coffee machine in a company office, as explained elsewhere herein. A coffee machine 310 has a handwritten access note 320 affixed to a side of the coffee machine 310; the note 320 includes a doodle and a description of a purpose of the note 320 (Coffee machine TIPS). An employee takes a photo of the handwritten access note 320 with a camera equipped smartphone 330. Content access mobile software processes the photo and converts the photo into a content access identifier 340, which is then submitted to a published content site 350, which includes an instructional video; access is permitted, content is retrieved from the site 350 and delivered to the smartphone 330 for playing on the screen of the smartphone 330, as illustrated by a content retrieval arrow 360.

Figure 4:
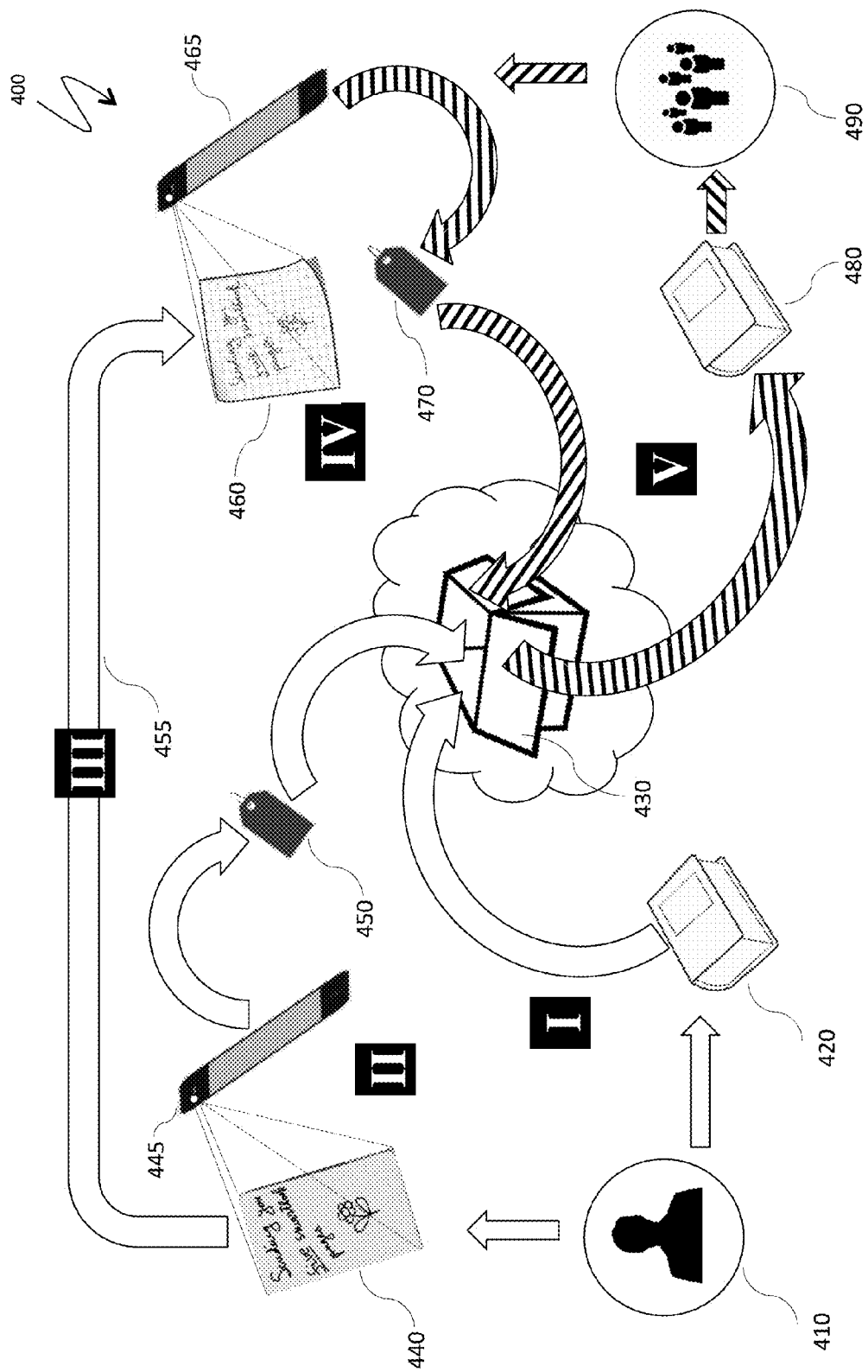
FIG. 4 is a schematic illustration of system architecture, according to an embodiment of the system described herein.

FIG. 4 is a schematic illustration 400 of system architecture. The illustration 400 shows five phases of content creation, authentication and retrieval denoted by I-V. In phase I, an author 410 creates or compiles content 420 and publishes the content 420 to a cloud-based content collection 430. In phase II, the author 410 creates a handwritten access note 440 (in FIG. 4, a handwritten note on a designated paper with dotted pattern). Then, the author 410 takes a photo of the handwritten access note 440 on a smartphone 445 and mobile software converts a resulting image into a content access identifier 450, which is associated with the published content 420. In phase III, the author transfers access note(s) to recipient(s) as illustrated by an arrow 455. In phase IV, a copy (or an original) 460 of the handwritten access note is photographed by a recipient using a smartphone 465 and converted by mobile software into a content access identifier 470. In phase V, the content access identifier 470 is used to authenticate the recipient and obtain access to the content 430. If authentication is successful, a copy of published content 480 is retrieved from the cloud and is delivered to recipient(s) 490.

Figure 5:
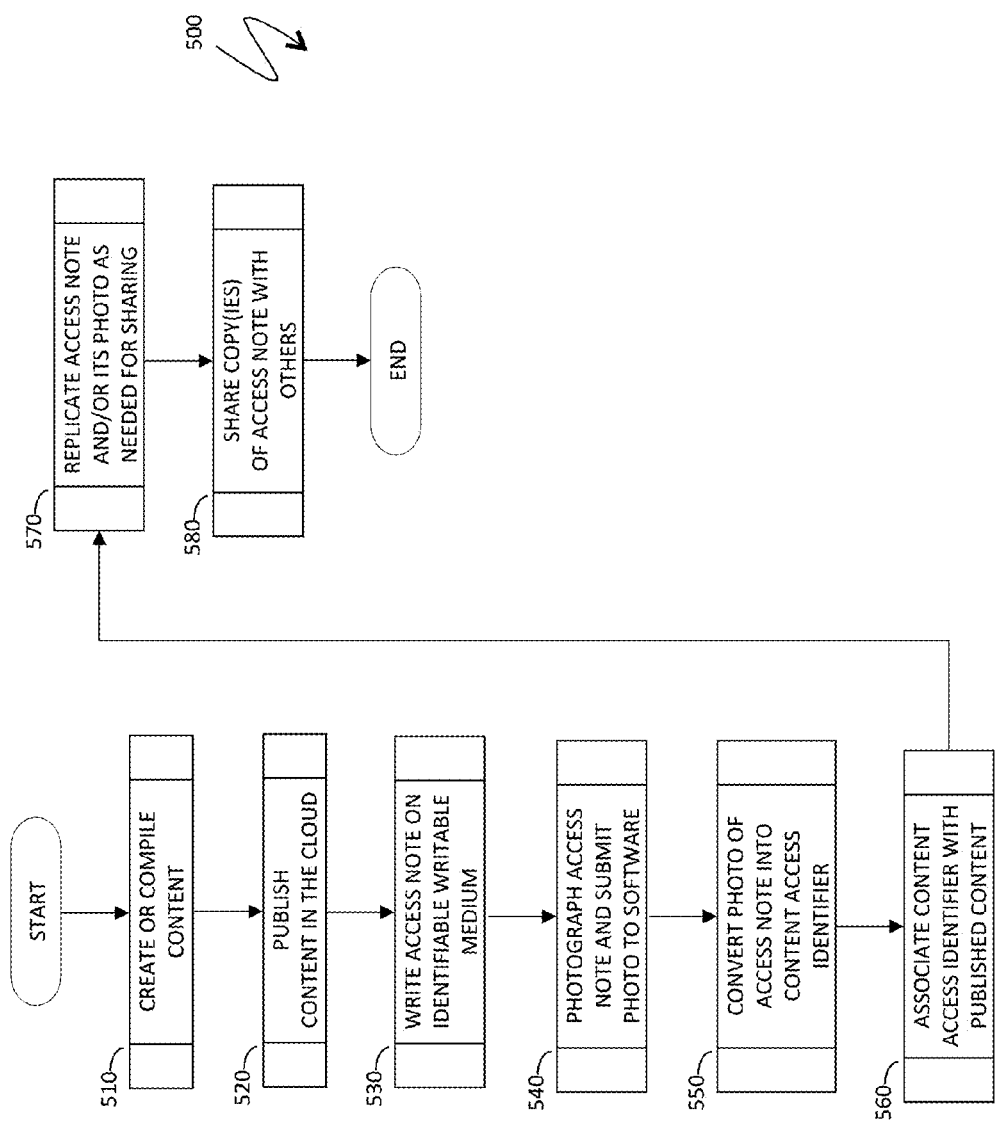
FIG. 5 is a system flow diagram for a content author, according to an embodiment of the system described herein.

Referring to FIG. 5, a flow diagram 500 illustrates creation of content by a content author according to an embodiment of the system described herein. Processing begins at a step 510 where the author creates or compiles content, as further explained in conjunction with the illustrations 200, 400. After the step 510, processing proceeds to a step 520 where the author interacts with the system to publish the content to the cloud. After the step 520, processing proceeds to a step 530 where the user writes a handwritten access note on an identifiable writable medium, such as shown in the illustration 100.

After the step 530, processing proceeds to a step 540 where the author takes a photo of the handwritten access note and submits a resulting digitized image to special software. After the step 540, processing proceeds to a step 550 where the digitized image of the access note is converted into a content access identifier. After the step 550, processing proceeds to a step 560 where the content access identifier is associated with the published content. After the step 560, processing proceeds to a step 570 where the author replicates the access note and/or a digitized image thereof as needed for sharing; both physical and electronic copies may allow recipients to restore the access identifier and obtain the content. After the step 570, processing proceeds to a step 580 where the author shares a copy (or copies) of handwritten access notes with one or more others to allow access by the other(s) to the original published content. After the step 580, processing is complete.

Figure 6:
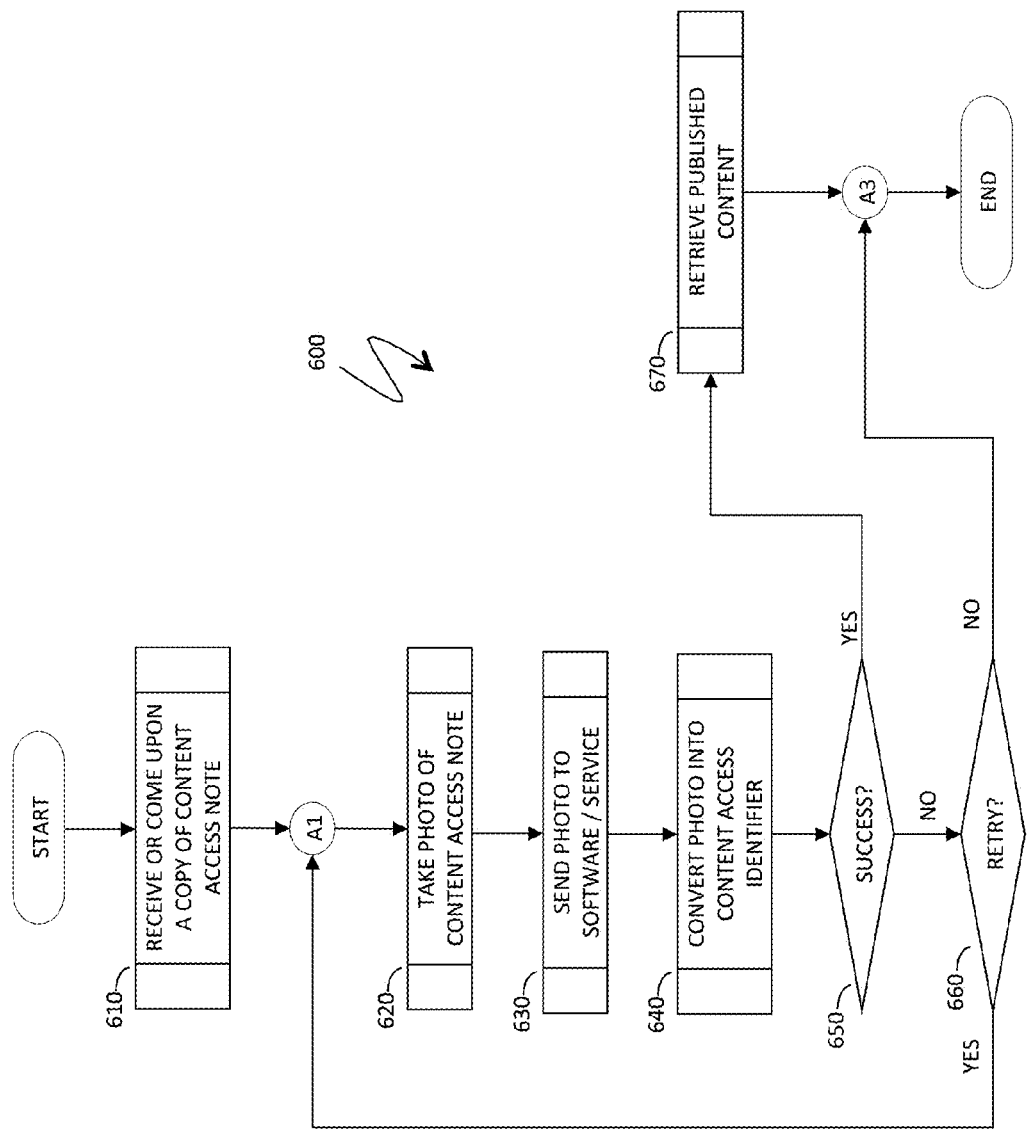
FIG. 6 is a system flow diagram for a content recipient, according to an embodiment of the system described herein.

Referring to FIG. 6, a flow diagram 600 describes steps performed by a content recipient according to several embodiments of the system described herein. Processing begins at a step 610 where a recipient receives or comes upon a copy of a handwritten access note, as explained elsewhere herein. See, for example, the illustration 400 (receiving a copy of a handwritten access note) and the illustration 300 (coming upon a copy of a handwritten access note). After the step 610, processing proceeds to a step 620 where the recipient takes a photo of the handwritten access note. After the step 620, processing proceeds to a step 630 where the recipient sends an image corresponding to the photo to mobile software or to a cloud service for further processing. After the step 630, processing proceeds to a step 640 where the software running on a mobile device or on a back end of a cloud service converts the photo into a content access identifier.

After the step 640, processing proceeds to a test step 650 where it is verified whether the conversion was successful. Such verification may be done by conversion software that, for example, checks the validity of the structure of a recovered content access identifier, including, for example, hash sum and other portions of the identifier designed for verification. Alternatively or additionally, the validity of the identifier may be checked online by submitting the identifier to the cloud service where the actual content is published and checking a response from that service. The response may be based on a result of a query looking for all descriptors of the search code associated with the identifier created at the step 640 with the stored full code of the identifier created at the step 550 of the illustration 500, as explained elsewhere herein in conjunction with the description of encoding technique. If the identifier is valid, processing proceeds to a step 670 where the recipient retrieves the published content using mobile or other software. After the step 670, processing is complete. If it is determined at the step 650 that the conversion was not successful, then processing proceeds to a test step 660 where it is verified whether the system should retry the conversion. The decision can be automatically made by the system, for example, in the event that an original photo of the handwritten access note submitted by the recipient was of relatively low quality, the system may use additional step(s) to clean up the photo. Alternatively, the decision can be made by a user in an interactive mode. If it is decided at the test step 660 that the system has to retry restoring the access identifier, processing proceeds back to the step 620, discussed above. Otherwise, processing is complete.

The system described herein may also implemented on and/or in cooperation with a cloud based content management system with mobile clients, such as the system provided by the Evernote service and software, developed by the Evernote Corporation of Redwood City, Calif. One or more of the mobile clients may be a mobile device as described herein, such as a conventional hand-held smartphone running one of several major mobile platforms, including iOS, Android, Windows Phone OS, Blackberry OS and mobile versions of Linux. The mobile device may run additional user software (e.g., an application) that provides the functionality described herein. The user software may be bundled (pre-loaded), installed from an app store or downloaded from a Web site.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screens described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a smartphone, although other devices are also possible.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing access to digitally published data, comprising:
    creating a note having at least a portion that is handwritten by a first user;
    creating a digital image of the note;
    converting handwriting of the note into a content access identifier that varies according to the portion that is handwritten by the first user, wherein a value for the content access identifier is determined by first subdividing the digital image of the note into a grid having a plurality of cells and determining individual values for each of the cells based on coordinates of each of the cells and a portion of handwriting therein and then combining the individual values to determine the value of the content access identifier, the individual values for each of the cells being a numeric array of frequency values corresponding to geometric characteristics of the portion of handwriting in each of the cells;
    associating the content access identifier with the digitally published data; and
    making the digitally published data available to a second user by making the note available to the second user.

2. A method, according to claim 1, wherein the geometric characteristics include tangent angles for each point on a handwritten trajectory of the portion of handwriting in each of the cells.

3. A method, according to claim 1, wherein the digitally published data is written to at least one of: a public database and a private database.

4. A method, according to claim 1, wherein a portion of the note is pre-printed.

5. A method, according to claim 4, wherein a pre-printed distinguishing pattern on the note indicates that handwritten content corresponds to a content access identifier.

6. A method, according to claim 4, wherein the pre-printed portion is a regular dotted pattern.

7. A method, according to claim 6, wherein the regular dotted pattern used to separate handwriting on the note from a background portion and to identify page corners and perform perspective correction.

8. A method, according to claim 1, wherein the note has a known identifiable color and size.

9. A method, according to claim 8, wherein color identification and size are used to separate handwriting on the note from a background portion and to identify page corners and perform perspective correction.

10. A method, according to claim 1, wherein converting the note includes obtaining a digital image thereof using a mobile device.

11. A method, according to claim 10, wherein obtaining the digital image includes one of: photographing the note and scanning the note.

12. A method, according to claim 1, wherein a mobile device converts the note into the content access identifier using software that is one of: pre-loaded with the device, installed from an app store, and downloaded from a Web site.

13. A method, according to claim 12, wherein the mobile device uses an operating system selected from the group consisting of: iOS, Android OS, Windows Phone OS, Blackberry OS and mobile versions of Linux OS.

14. A method of accessing digitally published data, comprising:
    receiving information corresponding to a note having at least a portion that is handwritten;
    creating a digital image of the note based on the information;
    converting handwriting of the note into a content access identifier that varies according to the portion that is handwritten, wherein a value for the content access identifier is determined by first subdividing the digital image of the note into a grid having a plurality of cells and determining individual values for each of the cells based on coordinates of each of the cells and a portion of handwriting therein and then combining the individual values to determine the value of the content access identifier, the individual values for each of the cells being a numeric array of frequency values corresponding to geometric characteristics of the portion of handwriting in each of the cells; and
    accessing the digitally published data using the content access identifier.

15. A method, according to claim 14, wherein the geometric characteristics include tangent angles for each point on a handwritten trajectory of the portion of handwriting in each of the cells.

16. A method, according to claim 14, wherein users cannot access the digitally published data without first accessing at least one of: the content access identifier and the note.

17. A method, according to claim 14, wherein information corresponding to the note includes at least one of: the note, a physical copy of the note, and a digital image of the note.

18. A method, according to claim 14, wherein the note is affixed to an item to provide information about the item.

19. A method, according to claim 18, wherein the information includes instructions for using the item.

20. A method, according to claim 14, wherein the note is affixed to a container to indicate contents thereof.

21. A method, according to claim 14, wherein converting the note includes obtaining a digital image thereof using a mobile device.

22. A method, according to claim 21, wherein obtaining the digital image includes one of: photographing the note and scanning the note.

23. A method, according to claim 14, wherein a mobile device converts the note into the content access identifier using software that is one of: pre-loaded with the device, installed from an app store, and downloaded from a Web site.

24. A method, according to claim 23, wherein the mobile device uses an operating system selected from the group consisting of: iOS, Android OS, Windows Phone OS, Blackberry OS and mobile versions of Linux OS.

25. Computer software, provided in a non-transitory computer readable medium, that provides access to digitally published data, the software comprising:
    executable code that creates a digital image of a handwritten note;
    executable code that converts handwriting of the note having at least a portion that is handwritten by a first user into a content access identifier that is determined by first subdividing the digital image of the note into a grid having a plurality of cells and determining individual values for each of the cells based on coordinates of each of the cells and a portion of handwriting therein and then combining the individual values to determine the value of the content access identifier, the individual values for each of the cells being a numeric array of frequency values corresponding to geometric characteristics of the portion of handwriting in each of the cells;
    executable code that associates the content access identifier with the digitally published data; and
    executable code that makes the digitally published data available to a second user by making the note available to the second user.

26. Computer software, according to claim 25, wherein the geometric characteristics include tangent angles for each point on a handwritten trajectory of the portion of handwriting in each of the cells.

27. Computer software, according to claim 25, wherein the digitally published data is written to at least one of: a public database and a private database.

28. Computer software, according to claim 25, wherein a portion of the note is pre-printed.

29. Computer software, according to claim 28, wherein a pre-printed distinguishing pattern on the note indicates that handwritten content corresponds to a content access identifier.

30. Computer software, according to claim 28, wherein the pre-printed portion is a regular dotted pattern.

31. Computer software, according to claim 30, wherein the regular dotted pattern used to separate handwriting on the note from a background portion and to identify page corners and perform perspective correction.

32. Computer software, according to claim 25, wherein the note has a known identifiable color and size.

33. Computer software, according to claim 32, wherein color identification and size are used to separate handwriting on the note from a background portion and to identify page corners and perform perspective correction.

34. Computer software, according to claim 25, wherein executable code that converts the note obtains a digital image thereof using a mobile device.

35. Computer software, according to claim 34, wherein obtaining the digital image includes one of: photographing the note and scanning the note.

36. Computer software, according to claim 25, wherein the software is one of: pre-loaded in a mobile device, installed from an app store, and downloaded from a Web site.

37. Computer software, according to claim 36, wherein the mobile device uses an operating system selected from the group consisting of: iOS, Android OS, Windows Phone OS, Blackberry OS and mobile versions of Linux OS.

38. Computer software, provided in a non-transitory computer-readable medium, that accesses digitally published data, the software comprising:
    executable code that receives information corresponding to a note having at least a portion that is handwritten;
    executable code that creates a digital image of the note;
    executable code that converts handwriting of the note into a content access identifier that varies according to the portion that is handwritten, wherein a value for the content access identifier is determined by first subdividing the digital image of the note into a grid having a plurality of cells and determining individual values for each of the cells based on coordinates of each of the cells and a portion of handwriting therein and then combining the individual values to determine the value of the content access identifier, the individual values for each of the cells being a numeric array of frequency values corresponding to geometric characteristics of the portion of handwriting in each of the cells; and
    executable code that accesses the digitally published data using the content access identifier.

39. Computer software, according to claim 38, wherein the geometric characteristics include tangent angles for each point on a handwritten trajectory of the portion of handwriting in each of the cells.

40. Computer software, according to claim 38, wherein users cannot access the digitally published data without first accessing at least one of: the content access identifier and the note.

41. Computer software, according to claim 38, wherein information corresponding to the note includes at least one of: the note, a physical copy of the note, and a digital image of the note.

42. Computer software, according to claim 38, wherein the note is affixed to an item to provide information about the item.

43. Computer software, according to claim 42, wherein the information includes instructions for using the item.

44. Computer software, according to claim 38, wherein the note is affixed to a container to indicate contents thereof.

45. Computer software, according to claim 38, wherein executable code that converts the note obtains a digital image thereof using a mobile device.

46. Computer software, according to claim 45, wherein obtaining the digital image includes one of: photographing the note and scanning the note.

47. Computer software, according to claim 38, wherein the software is one of: pre-loaded in a mobile device, installed from an app store, and downloaded from a Web site.

48. Computer software, according to claim 47, wherein the mobile device uses an operating system selected from the group consisting of: iOS, Android OS, Windows Phone OS, Blackberry OS and mobile versions of Linux OS.

* * * * *